V. J. ODHNER.
CALCULATING MACHINE.
APPLICATION FILED MAY 27, 1919.

1,361,542.

Patented Dec. 7, 1920.
4 SHEETS—SHEET 1.

INVENTOR
V. J. Odhner,
By H. R. Kerslake
ATTORNEY

V. J. ODHNER.
CALCULATING MACHINE.
APPLICATION FILED MAY 27, 1919.
1,361,542.
Patented Dec. 7, 1920.
4 SHEETS—SHEET 2.
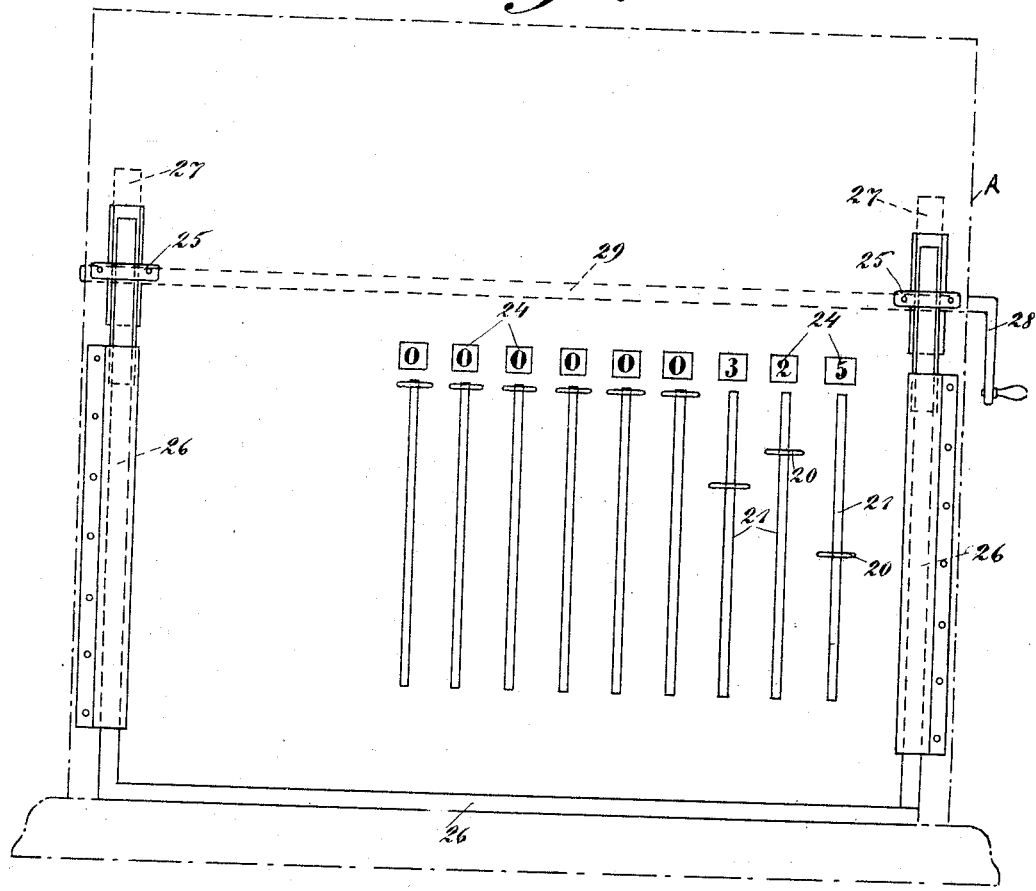
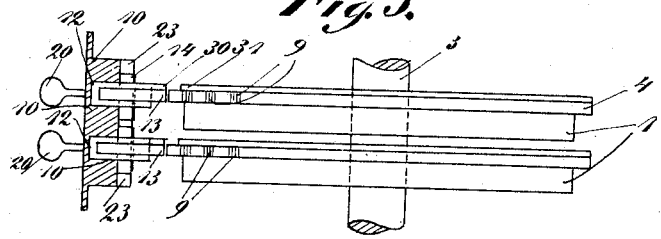
INVENTOR
V. J. Odhner,
By K. R. Kerslake
ATTORNEY

V. J. ODHNER.
CALCULATING MACHINE.
APPLICATION FILED MAY 27, 1919.

1,361,542.

Patented Dec. 7, 1920.
4 SHEETS—SHEET 3.

INVENTOR
V. J. Odhner,
By H. R. Kerslake
ATTORNEY

V. J. ODHNER.
CALCULATING MACHINE.
APPLICATION FILED MAY 27, 1919.

1,361,542.

Patented Dec. 7, 1920.
4 SHEETS—SHEET 4.

INVENTOR
V. J. Odhner,
By H. R. Kerslake
ATTORNEY

UNITED STATES PATENT OFFICE.

VALENTIN JAKOB ODHNER, OF STOCKHOLM, SWEDEN.

CALCULATING-MACHINE.

1,361,542. Specification of Letters Patent. Patented Dec. 7, 1920.

Application filed May 27, 1919. Serial No. 300,177.

*To all whom it may concern:*

Be it known that I, VALENTIN JAKOB ODHNER, a subject of the King of Sweden, and resident of Karlaplan 2, Stockholm, in the kingdom of Sweden, have invented certain new and useful Improvements in Calculating-Machines, of which the following is a specification, reference being had therein to the accompanying drawings.

In calculating machines of the type described in Patent No. 514725, dated February 13, 1894, rotatable calculating wheels are provided, and adjustable pins are mounted in the same, the shifting of the pins being generally effected by means of curve disks, located at the side of the calculating wheels respectively and provided with slots, engaged by projections on the pins. It has been proposed to turn the curve disks by means of slidable racks which are brought into engagement with teeth or the like provided on the curve disks. During the calculating operation the said racks, evidently, must be out of engagement with the curve disks and consequently, must be brought into engagement with the same before the shifting of the curve disks. Hitherto this has been effected through a special manipulation, which renders troublesome the using of the machine. In order to remove the said disadvantage the machine, according to this invention, is so arranged that the rack is brought automatically in operative position by a hand lever, by means of which the rack after the engaging of the same, is moved in one or the other direction. Also the disengaging of the rack is effected automatically, as the said lever is released, in consequence whereof the shifting of the curve disks may be effected in a comfortable and reliable manner.

Figure 1:
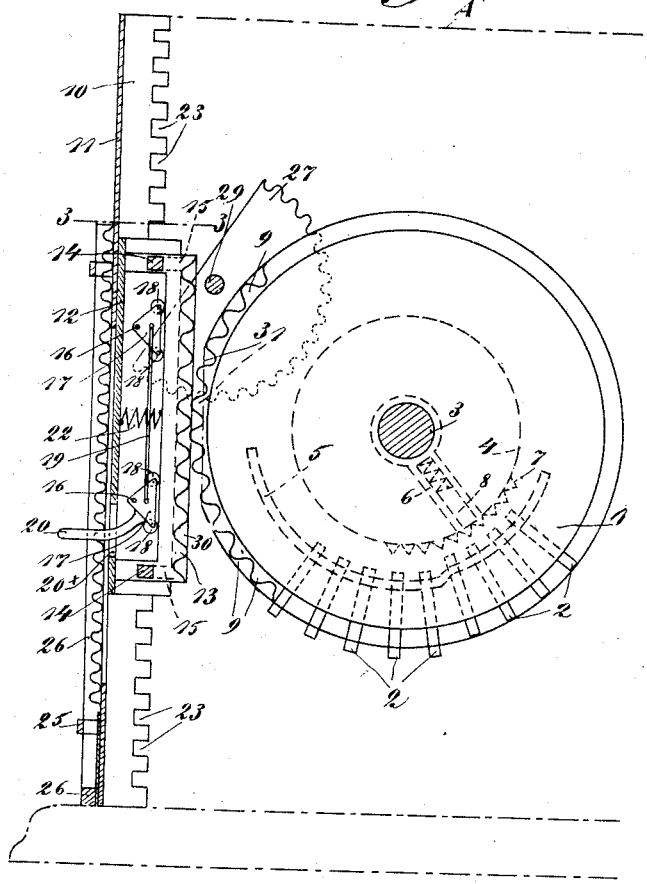
Figure 4:
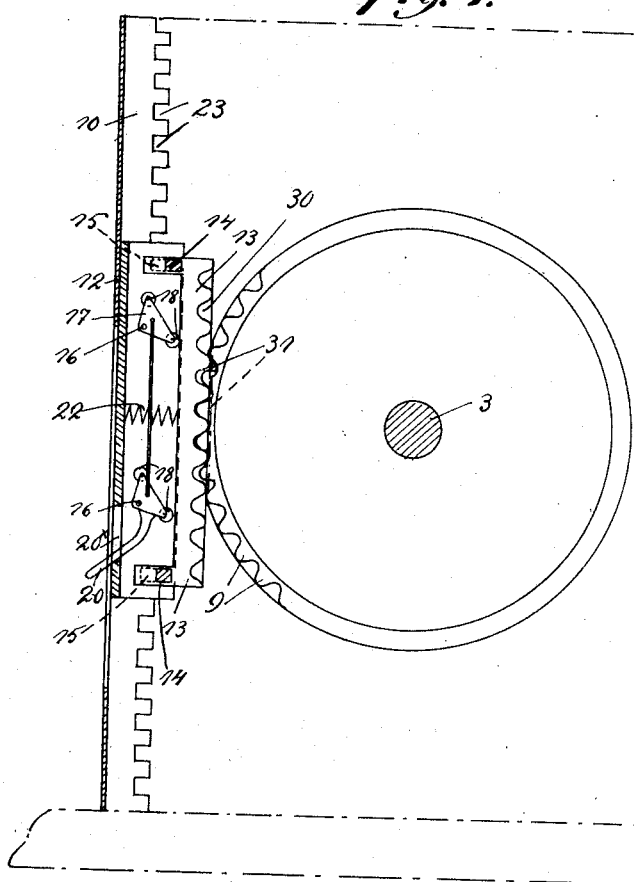
Figure 5:
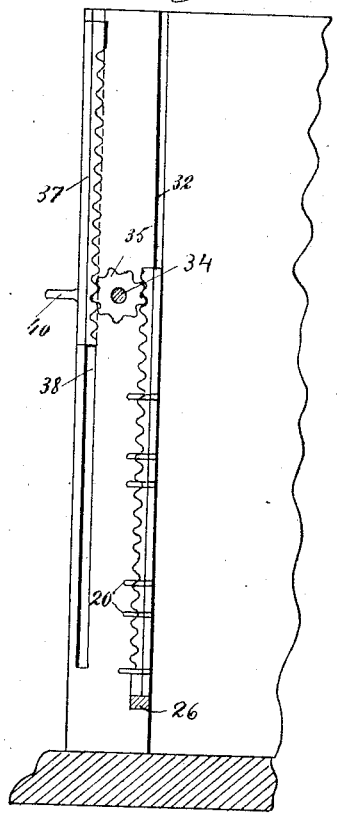
Figure 6:
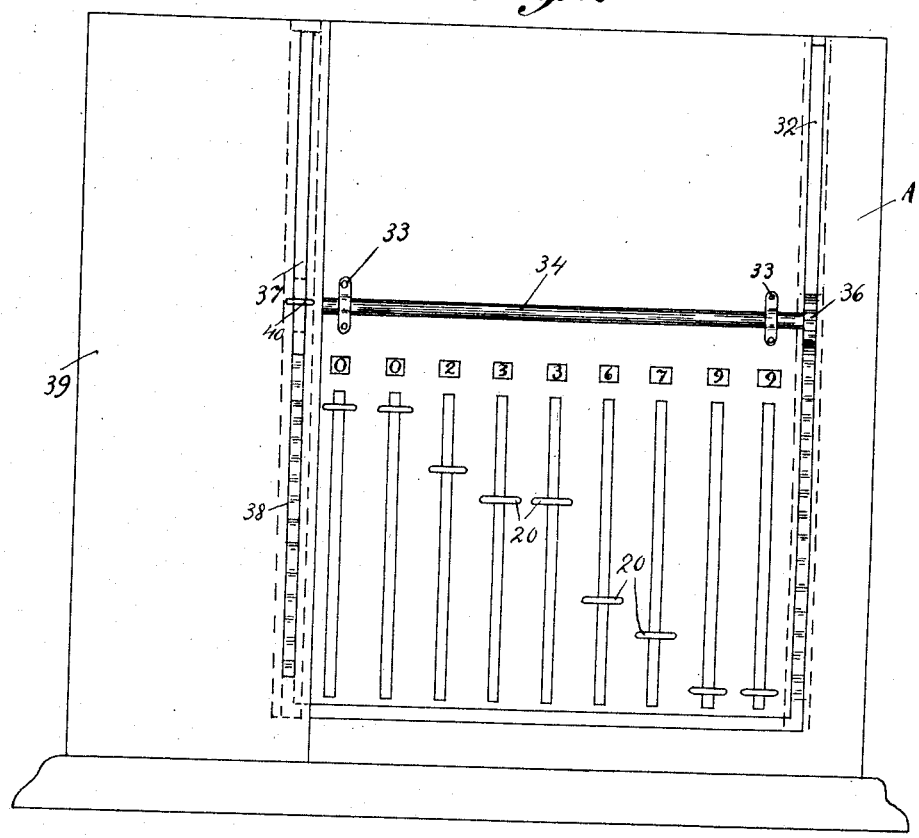

In the accompanying drawings a form of the invention is shown as an example in Figures 1 to 4 inclusive. Fig. 1 is a side view of one of the calculating wheels and the shifting device belonging to the same. Fig. 2 is a front view of the calculating machine. Fig. 3 is a plan view of two calculating wheels and the shifting device. Fig. 4 shows in a side view the shifting device in another position. Figs. 5 and 6 are a side view and a front view of a modified form of the invention. Only so much of the machine is shown as is necessary to illustrate the invention.

1 is one of the calculating wheels provided with the pins 2. The calculating wheels are fixed to the shaft 3, journaled in the casing A. The shaft 3 is rotated by means of a crank, as usual. 4 is the curve disk, rotatably mounted on the shaft 3 and provided with a slot 5 for the shifting of the pins. The curve disk 4 is held in adjusted position by a catch 8, acted upon by a spring 6 and engaging teeth 7 of the disk 4. The disk 4 is provided with teeth 9. In a vertical guide 10 provided in the front wall 11 of the casing A, which wall is straight and vertical, a slide 12, U-shaped in cross section, is movable. The said slide is located opposite to the calculating wheel 1 and is provided on its front side with figures from 0 to 9 located in a row, extending downward along the slide. A rack 13 is movable in the slide transversely of the same and engages by means of projections or pins 14 grooves 15, provided in the side walls of the slide 12. Consequently, the rack is caused to partake in the motion of the slide but may be moved laterally in the same. The rack is adapted to engage the teeth 9 of the curve disk 4. For the engaging of the rack two angular levers in the shape of triangular disks 17 are pivoted at 16 to the slide, in the free corners of which rollers 18 are journaled. The disks are connected with one another by a link 19 and may be swung simultaneously by means of a handle 20 extending from one of the disks and through an opening 20ˣ, provided in the slide, and a slot 21 provided in the wall 11. A spring 22 fixed to the rack 13 and the slide 12 normally keeps the rack in its retracted position in the slide. In the side walls of the guide 10 notches 23 are provided, which the projections 14 of the rack normally engage and lock the slide in its position.

The shifting device now described operates in the following manner. For the shifting of the pins of the calculating wheel 1 one grasps the handle 20 and swings the same downward or upward, dependent on if one proceeds from a figure of a lower to a figure of a higher value or vice versa. The disks 17 are thus swung around their pivots and force the rack toward the right against the action of the spring 22, so that the rack engages the teeth 9 of the wheel 4. The inward movement of the rack is limited by the handle 20 engaging the lower or the upper edge respectively of the opening 20×. At the same time the projections 14 are disengaged from the notches 23, so that the slide together with the rack may be moved downward or upward, Fig. 4. As the slide is moved downward, the rack 13 rotates the curve disk 4, which thus shifts the pins 2. According as the slide is moved the figures of the same become visible in the opening 24 of the wall 11 and indicates the number of pins 2 brought into the operative position. Fig. 2 shows the pins of the calculating wheels shifted to positions corresponding to the number 325. Owing to the fact that the figures located at the openings 24 are easily observed and are located in a single row, the number is easily controlled, for which the pins are adjusted and no mistake can be made. After the number of pins has been pushed out, the handle 20 is released. The rack 13 is then retracted by the spring 22 and brought out of engagement with the teeth 9 and into engagement with the notches 23, so that the slide is locked in adjusted position. If the slide has been moved into a position, in which the corresponding tooth has not been fully pushed out, the projections 14 are not located opposite to two notches 23 and consequently the rack can not be drawn out of engagement with the curve disk 4 even if the handle 20 is released. This insures, that one of the teeth of the rack 13 always engages the same notch of the disk 4 and that a certain figure of the slide always corresponds to a certain number of pins pushed out. The shifting device operates in the same manner also when the handle 20 is swung upward.

In order that the shifted slides and disks 4 together with the pins 2 may be returned simultaneously to their initial positions, a U-shaped bar 26, provided with teeth, is movable in guides 25. Toothed segments 27 on a shaft 29, which is rotated by means of a crank 28, may be brought into engagement with the teeth of the said bar 26. Normally, the said segments are out of engagement with the bar 26 but engage the same, as the shaft 29 is rotated. The bar 26 is then raised and brings with itself all shifted handles 20, so that the latter force the corresponding racks into engagement with the disks 4. While the bar is raised, the slides and the racks are moved to their upper position and the pushed out pins are retracted into the calculating wheels. The toothed segments are so arranged, that they leave the bar 26 after raising of the same. The bar 26 then falls down to its lowermost position acted upon by its weight. Consequently, the returning of the parts is effected by rotating the crank 28 through one revolution.

In order to render impossible the shifting of the slide 12 and moving of the same, unless the calculating wheel 1 with the disk 4 is at zero, a straight side 30 is provided on the rack 13, extending along the set of teeth and a straight part 31 provided on the circumferential surface of the calculating wheel, which, while the calculating wheel is in zero, is located opposite to the straight side 30 of the rack and at such a distance from the same, that the calculating wheel does not prevent the moving of the rack 13 into engagement with the teeth of the disk 4 and the subsequent shifting of the disk. If on the other hand the calculating wheel is not in zero, its circular part is located opposite to the side 30 and prevents the moving of the rack 13 toward the right i. e. into engagement with the disk 4. If the rack 13 has not been properly shifted but its projections 14 bear against the parts located between the notches 23 of the guides 10, the rack prevents the rotating of the calculating wheel by means of the side 30.

Consequently, there is a guarantee of the parts operating properly.

In the machine shown in Figs. 5 and 6 the shanks of the bar 26 are T-shaped in cross section and movable in correspondingly shaped guides 32 in the frame or casing A of the machine. In bearings 33 on the casing A a shaft 34 is journaled, which is located outside the bar 26 and provided with two pinions 35, 36, meshing with the shanks respectively of the bar 26. A rack 37 which is slidable in a guide 38 provided in a hood 39 on the casing A, meshes with one of the said pinions, for instance the left one 35. The rack 37 has a handle 40, by means of which the rack 37 may be moved upward and downward.

As the U-shaped bar 26 is in its lower, normal position, the rack 37 is in its upper position, as shown, in which it is held by the heavier bar 26 and, if necessary, by a spring not shown. When a number of slides has been shifted and should be returned to zero, one grasps the handle 40 and moves the rack 37 downward. The rack 37 then moves the bar 26 upward by means of the pinions 35, 36 and the bar 26 brings with itself the handles 20 on the slides and moves the same and the slides upward to zero. As the handle 40 is released the bar 26 falls downward and raises the rack 37. The movement of the latter upward as well as downward is limited by abutments. Consequently, also in this case the resetting of the slides may be effected by a single manipulation. The rack 37 remains always in engagement with the pinion 35, in consequence whereof the shifting device never can get out of gear. The rack 37 may, evidently, be provided at the right part of the machine or a rack may be provided at both pinions 35, 36 for the shifting of the U-shaped bar.

Having now described my invention, what I claim as new and desire to secure by Letters Patent is:

1. In a calculating machine the combination with calculating wheels, adjustable pins provided on the same, curve disks or the like for shifting the said pins, teeth or the like provided on the said curve disks, rods provided with teeth or the like and adapted to engage the teeth of the said curve disks respectively, of slides, movable in guides in the frame of the machine, guides in the said slides, in which the said rods respectively are movable transversely, and lever mechanisms, which are provided on the said slides respectively and when actuated, force the said rods into engagement with the teeth of the curve disks and then move the slides together with the rods, thus shifting the curve disks and the pins of the calculating wheels.

2. In a calculating machine the combination with calculating wheels, adjustable pins provided on the same, curve disks or the like for shifting the said pins, teeth or the like provided on the said curve disks, rods provided with teeth or the like and adapted to engage the teeth of the said curve disks respectively, of slides movable in guides in the frame of the machine, guides in the said slides, in which the said rods respectively are movable transversely, lever mechanisms provided on the said slides respectively and, when actuated, forcing the said rods into engagement with the teeth of the curve disks and then moving the slides together with the rods, thus shifting the curve disks and the pins of the calculating wheels and a projection on the said rods respectively and coöperating with notches provided in guides for the slides, substantially as described and for the purpose set forth.

3. In a calculating machine the combination with calculating wheels, adjustable pins provided on the said wheels, curve disks or the like for shifting the said pins, teeth or the like provided on the said curve disks, rods provided with teeth or the like and adapted to engage the teeth of the said curve disks respectively, of slides, movable in guides in the frame of the machine, guides in the said slides, in which the said rods respectively are movable transversely, lever mechanisms provided on the said slides respectively, means whereby the rods, as the lever mechanisms are actuated are brought into engagement with the teeth of the curve disks and the slides together with the rods are then moved shifting the curve disks and the pins of the calculating wheels, a bar engageable with the set of lever mechanisms for returning said mechanism to a predetermined position, guides for the said bar, and means for moving the said bar, substantially as described and for the purpose set forth.

4. In a calculating machine the combination with calculating wheels, adjustable pins provided on the said wheels, curve disks or the like for shifting the said pins, teeth or the like provided on the said curve disks, rods provided with teeth or the like and adapted to engage the teeth of the said curve disks respectively, of slides movable in guides in the frame of the machine, guides in the said slides, in which the rods respectively are movable, lever mechanisms, provided on the said slides respectively, means whereby the rods, as the lever mechanisms are actuated, are brought into engagement with the teeth of the curve disks and the slides together with the rods are then moved, shifting the curve disks and the pins of the calculating wheels, a straight side provided on the rods respectively, and a straight part on the circumferential surface of the calculating wheels respectively, coöperating with the said straight side of the rods, substantially as described and for the purpose as set forth.

5. In a calculating machine the combination with calculating wheels, adjustable pins provided on the said wheels, curve disks or the like for shifting the said pins, teeth or the like provided on the said curve disks, rods provided with teeth or the like and adapted to engage the teeth of the said curve disks respectively, of slides, movable in guides in the frame of the machine, guides in the said slides, in which the said rods respectively are movable transversely, lever mechanisms provided on the said slides respectively, means whereby the rods, as the lever mechanisms are actuated, are brought into engagement with the teeth of the curve disks and the slides together with the rods are then moved shifting the curve disks and the pins of the calculating wheels, a bar, extending along the set of lever mechanisms, guides for the said bar, a shank provided on the said bar, teeth provided on the said shank, a pinion engaging the said teeth, and a manually operated rack engaging the said pinion.

In witness whereof I have hereunto signed my name.

VALENTIN JAKOB ODHNER.